United States Patent [19]

Scheurer

[11] Patent Number: 5,250,141

[45] Date of Patent: Oct. 5, 1993

[54] HAND-HELD APPARATUS FOR VULCANIZING THE BEAD ZONE OF A PNEUMATIC TIRE

[75] Inventor: Hans Scheurer, Munich, Fed. Rep. of Germany

[73] Assignee: Stahlgruber, Otto Gruber GmbH & Co., Munich, Fed. Rep. of Germany

[21] Appl. No.: 695,190

[22] Filed: May 3, 1991

[30] Foreign Application Priority Data

May 4, 1990 [DE] Fed. Rep. of Germany .... 9005098[U]

[51] Int. Cl.5 .............................................. B29C 73/34
[52] U.S. Cl. ................................. 156/398; 156/583.9; 156/95; 81/15.2; 219/243; 269/34; 100/93 P; 100/271
[58] Field of Search ................... 156/95, 97, 359, 398, 156/421.6, 421.8, 583.9; 81/15.2, 15.3; 219/243; 254/50.1, 50.3; 269/25, 27, 30, 34, 26; 425/12; 100/93 P, 271

[56] References Cited

U.S. PATENT DOCUMENTS

| | | | |
|---|---|---|---|
| 2,272,965 | 2/1942 | Crowley | 219/243 X |
| 2,356,858 | 8/1944 | Laurence | 219/243 X |
| 4,347,096 | 8/1982 | Schorscher | 219/243 X |
| 4,966,640 | 10/1990 | Hill | 156/394.1 |

FOREIGN PATENT DOCUMENTS

| | | |
|---|---|---|
| 850805 | 9/1952 | Fed. Rep. of Germany . |
| 3719442 | 12/1988 | Fed. Rep. of Germany . |
| 1095822 | 6/1955 | France . |
| 1110742 | 2/1956 | France . |
| 1248832A1 | 8/1988 | U.S.S.R. . |
| 607430 | 8/1948 | United Kingdom . |

OTHER PUBLICATIONS

"Bead Repair Press"—copy of Brochure.

Primary Examiner—Michael W. Ball
Assistant Examiner—Francis J. Lorin
Attorney, Agent, or Firm—Pennie & Edmonds

[57] ABSTRACT

A hand-held apparatus for vulcanizing the damaged bead zone of a pneumatic tire. The apparatus includes tongs to engage the bead to be repaired and a hold-up element to engage the diametrically opposite point on the bead. At least one transport and manipulation handle is provided for carrying the apparatus and at least one actuator is included to activate the tongs and the hold-up element.

13 Claims, 2 Drawing Sheets

HAND-HELD APPARATUS FOR VULCANIZING THE BEAD ZONE OF A PNEUMATIC TIRE

BACKGROUND OF THE INVENTION

Devices are available for vulcanizing the bead zones of a pneumatic tire. They are generally heavy and large in size and stationary in construction. Such devices are constructed with a middle support element for the tire, an electrically heatable pair of tongs, disposed at one end of the support element, where the jaws of said tongs grip the bead point that is to be vulcanized, a hold-up element that is disposed extendably at the other end of the support element and is supported against the diametrically opposite bead point, and means to activate the tongs and to extend the hold-up element.

A prospectus "Bead Repair Press" of Mohawk Rubber Sales Company Inc. describes such an apparatus, in which a plate-shaped support element is mounted on a stand that is anchored on the floor. A slide-like hold-up element is placed on this support element. This hold-up element can be moved by means of a hand lever, via an articulated linkage. Its frontal surface is appropriately profiled, and is supported against a section of that tire bead which is diametrically opposite the portion of the bead that needs repair. At the other end of the plate-shaped support element there are tongs with electrical heating elements built into their jaws. These tongs can be closed and opened by means of a second hand lever, via another articulated lever linkage. Here its two jaws enclose the bead point that needs repair and exert a certain pressure on it during the vulcanization process. The heating cartridges in the jaws are connected, by way of a thermostat, to a patch cord. This apparatus is mounted in a stationary manner and is used to repair pneumatic tires which have been damaged in the bead area. Such damage occurs, e.g., when the tires are improperly mounted on rims, when the tires run up on the edges of curbs, or the like.

Before the vulcanization process, the damaged points are roughened, and the damage funnels are filled with a suitable vulcanizing material with slight superelevation. The pneumatic tire is then placed on the plate-shaped support element so that the bead point being repaired is situated between the jaws. By activating the appropriate hand lever, the hold-up element is then moved so that its profiled frontal surface presses against the bead section which is situated diametrically opposite the bead point being repaired. As a result, the bead paint that is being repaired is solidly pulled between the jaws. Then the second hand lever is activated to close the jaws of the tongs and to exert the highest possible pressure on the bead point that is being vulcanized. Before this, the heating cartridges that are built into the heating jaws are activated, so that the jaws have a temperature of about 150° at their effective outer side. After the somewhat lengthy vulcanization process has been concluded the two hand levers are activated in the opposite direction, and the tire is manually removed from the apparatus.

Especially with large tires, difficulties result in actual practice when lifting them and when inserting them into the apparatus, on account of their dimensions and especially on account of their heavy weight. Furthermore, because hand levers are used for activation, especially for activating the jaws of the tongs, it is not assured that the compressive force necessary for optimal vulcanization has actually been achieved.

SUMMARY OF THE INVENTION

It is an object of the invention to create an apparatus to vulcanize the damaged bead zones of a pneumatic tire, which apparatus can be used independent of location, and which always guarantees optimal vulcanization conditions.

According to the invention, the apparatus is constructed as a light-weight manual device and has at least one transport and manipulation handle as well as at least one actuator to activate the tongs and the hold-up element.

At least one pressure cylinder is used for a pressure actuator means to extend the hold-up element. This achieves the result that the apparatus, which is annually positioned on a tire lying e.g. on a table or on the floor, is fixed quickly and precisely at the intended vulcanization position. The process by which the jaws of the tongs close about the bead point that is being vulcanized suitably takes place at the same time and with the same force, which is generated by a common cylinder for pressure means or also by a separate one.

The lower jaw of the tongs is pivotable to achieve a favorable distribution of the pressure forces over the entire bead section that is being vulcanized. This pivoting lower jaw also facilitates correct insertion of the bead into the tongs, after this section has undergone preliminary preparation.

During mounting and clamping, the apparatus is handled especially simply and quickly by using a common manual control valve which simultaneously controls the supply of pressure means to the pressure cylinders, if separate cylinders are used for the hold-up element and the tongs.

So that different types of tires can be repaired, the hold-up element is connected, via an extendable rod, to the cylinder of the pressure actuator means which is disposed along the same axis. Furthermore, the jaws of the tongs and also of the hold-up element can have replaceable linings for adapting them to various shapes and sizes of the bead.

The extending motion of one of the cylinders for the pressure means is suitably converted into the closing motion of the jaws of the tongs through a lever linkage which grips the pivotable jaw and transmits the force.

Another suitable development of the invention is characterized by the two jaws of the tones not only being capable of a pivoting motion but also of a translational motion with respect to one another. This increases their opening width, and thus facilitates insertion of the tire bead.

A structurally simple and light-weight construction of the inventive apparatus is characterized by the provision of only a single cylinder for the pressure means. This single cylinder functions to extend the hold-up element and to also activate the jaws of the tongs. In this case, the cylinder housing of the cylinder for the pressure means is disposed at the support element so as to be movable longitudinally, and is connected to the pivotably mounted jaw by means of a suitable pivoted lever linkage. The introduction of a pressure means into the cylinder simultaneously causes an extending motion of the piston rod with the hold-up element as well as a counter-motion of the cylinder housing. Here, the latter, acting through the lever linkage, causes the jaws of the tongs to close.

Another possible construction of the inventive apparatus consists in the apparatus containing a hydraulic hand pump, which is connected to one or both cylinders of the pressure actuator means, and which charges these cylinders with compressed oil, using a hand lever for activation.

Figure 1:
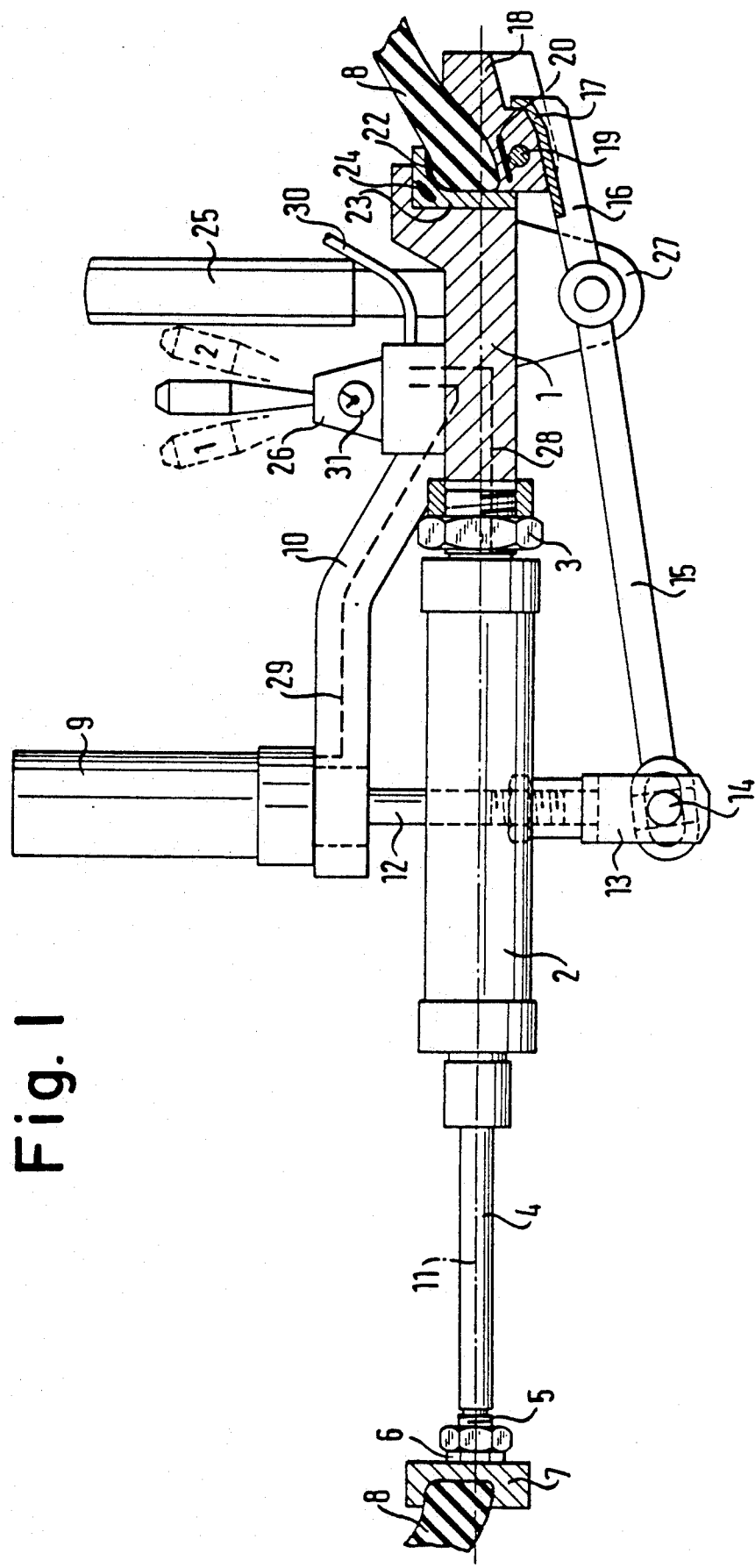
FIG. 1 is a side elevation, partly cross-section, of the apparatus of the present invention.

The hand device as shown in FIG. 1 comprises a plate-shaped support element (1) at the left end of which a compressed air cylinder (2) is rigidly mounted by a screw connection (3). The piston rod (4) of the compressed-air cylinder (2) has a threaded section (5) at its end. Through an intermediate piece (6), a hold-up element (7) is screwed onto this threaded section (5). The opening of the hold-up element (7) is matched to the shape of the tire bead (8).

Another cylinder (9) for compressed air is fastened at the support element (1), by way of a support arm (10) that is set off at an angle. Here the longitudinal axis of this cylinder (9) for compressed air is displaced laterally and runs perpendicular to the longitudinal axis (11) of the apparatus. The piston rod (12) of the cylinder (9) of the pressure actuator means has an articulated connection to the end of a double lever (15). This connection is made through an intermediate piece (13) with an adjustment thread and a linkage (14). The free arm (16) of the double lever (15) grips a lower jaw (18) of a set of pressing and clamping tongs by way of a spreader spring (17). The lower jaw (18) is mounted at the support element so as to be pivotable about a pin (19). A heating element (20) is built into this pivotable jaw (18) of the pressing and clamping tongs. Through electrical lines, which are not shown, the heating element (20) is connected to a power supply, by way of a thermostat. In its operating position, which is shown in the drawing, the jaw (18) grips the underside of the tire bead (8). The point on the tire bead (8) which is supposed to be vulcanized is designated at (22).

The respectively most favorable vulcanization time can be set at a switch-clock timer (31). After this time has elapsed, the power supply of the heating elements (20) and (24) is disconnected. Here, the heating elements (20) and (24) are replaceably built into the jaw (18) and its counter-jaw (23). If appropriate, the compressed air cylinder (9) which acts on the lower jaw (18) is also ventilated.

In the embodiment shown, the end of the support element is widened; in a cut-out section, it has a lining which forms the stationary counter-jaw (23) with the built-in heating element (24).

Furthermore, a handle (25) and a manual switching valve (26) are rigidly mounted on the upper size of the support element. Also, a pillow block (27) for the double lever (15, 16) is rigidly mounted on the underside of said support element. The handle (25) is used for transport and for placing the relatively light-weight hand device into the interior space of a pneumatic tire at the level of the bead 20 that is being repaired. The device weights about 3 to 5 kg. By moving the manual control valve (26),the two compressed air cylinders (2) and (9) are simultaneously charged with compressed air or are ventilated, by way of the compressed air lines (28, 29), which are shown by dashes. The compressed air is here conducted from an external supply, through a hose (30), to the valve.

Figure 2:
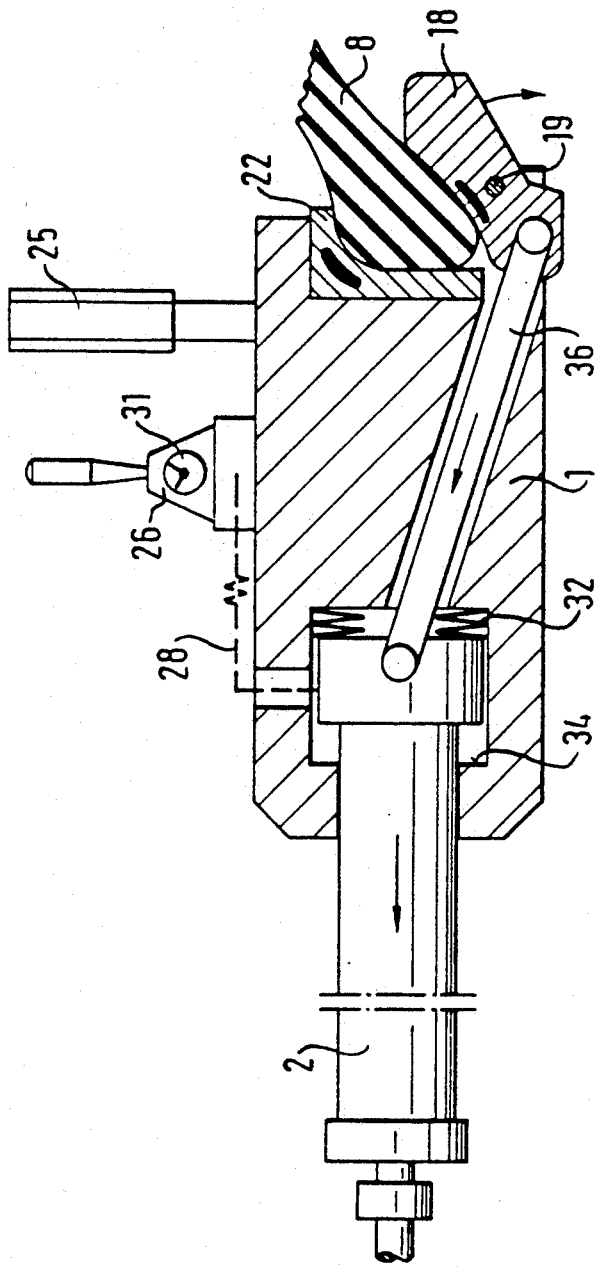
FIG. 2 is a view, similar to FIG. 1, of an alternative embodiment of the invention.

The invention is not limited to the embodiment shown and described above. Rather, merely a single compressed air cylinder can also be used as shown in FIG. 2. In this construction, the cylinder (2) is mounted at the support element (1) so as to be movable axially, and is connected to the movable jaw (18) by way of a suitable lever linkage. At the back end of the cylinder 2, disk springs (32) are arranged which are pressed together during vulcanization; and after release of the pressure in the cylinder (2), shift the cylinder (2) to the left side until reaches stop (34). Rod (36) is entrained and the jaw (18) is pivoted around the pin (19) in the open position thereof.

On the other hand, it is also possible to use one or two hydraulic cylinders instead of the compressed air cylinders. These hydraulic cylinders are connected to an integrated hand pump with an appropriate fluid reservoir. When the hand pump is activated by means of a hand lever, the hydraulic cylinders are charged with compressed oil, and are relieved by means of a manual control valve.

For special applications, e.g. for smaller tire sizes, a simplified vulcanization apparatus may also be suitable. Instead of the cylinders for pressure actuator means, such an apparatus uses manually movable levers to generate the clamping forces for the hold-up element and the tongs. These levers are hinged at the support element. They act through a so-called ratchet or an articulated lever linkage with step-down action and force limitation, and are thus connected to the hold-up element or to the movable jaw of the tongs. No external supply of pressure means is needed for these devices.

I claim:

1. A hand-held apparatus for vulcanizing the bead zone of a pneumatic tire comprising;
   a) a support element (1);
   b) electrically heatable tongs disposed at one end of the support element and having jaws (18, 23) for gripping the section of the bead that is to be vulcanized;
   c) a hold-up element (7) disposed extendably at the other end of the support element for supporting against the diametrically opposite side of the bead from the section of the bead to be vulcanized;
   d) at least one transport and manipulation handle (25) connected to said support element for transporting the apparatus and placing it in operative position relative to the section of the bead of the tire to be vulcanized; and
   e) means for moving the tongs between an opened and closed position and to extend and retract the hold-up element, said means including at least one actuator (2, 9) for activating the tongs (18, 23) and the hold-up element (7); said actuator for moving the tongs (18, 23) and for extending the hold-up element (7) including:
      i) two pressure actuated cylinders (2, 9) connected to a pressure supply line; and
      ii) a common manual control valve (26) for operating the cylinders.

2. The apparatus of claim 1, wherein:
   a) the hold-up element (7) is connected by way of an extendable rod (11) to the pressure cylinder (2); and
   b) said cylinder and rod are disposed along the same axis.

3. The apparatus of claim 1, wherein the pressure cylinder (9) is connected to the movable jaw (18) of the tongs through a lever linkage (13-16) and a spreader spring (17).

4. A hand-held apparatus for vulcanizing the bead zone of a pneumatic tire comprising;
 a) a support element (1);
 b) electrically heatable tongs disposed at one end of the support element and having jaws (18, 23) for gripping the section of the bead that is to be vulcanized;
 c) a hold-up element (7) disposed extendably at the other end of the support element for supporting against the diametrically opposite side of the bead from the section of the bead to be vulcanized;
 d) at least one transport and manipulation handle (25) connected to said support element for transporting the apparatus and placing it in operative position relative to the section of the bead of the tire to be vulcanized; and
 e) means for moving the tongs between an opened and closed position and to extend and retract the hold-up element, said means including at least one actuator (2, 9) for activating the tongs (18, 23) and the hold-up element (7); said actuator including a single cylinder (2) mounted on the support (1) for longitudinal movement, said cylinder being connected at one end to the movable jaw (18) of the tongs by way of an articulated lever linkage (36), and at its opposite end to the hold-up element (7) by way of a piston rod (11) extending from its other end.

5. A hand-held apparatus for vulcanizing the bead zone of pneumatic tire comprising;
 a) a support element (1);
 b) electrically heatable tongs disposed at one end of the support element and having jaws (18, 23) for gripping a first section of the bead that is to be vulcanized;
 c) electric heating means disposed within said tongs for heating them;
 d) a hold-up element (7) disposed extendably at the other end of the support element for extending diametrical movement toward and away from said tongs and into supporting engagement against a second section of the bead diametrically opposite the first section of the bead to be vulcanized;
 e) at least one transport and manipulation handle (25) connected to said support element for transporting the apparatus and placing and supporting it on the tire in operative position relative to the section of the bead of the tire to be vulcanized; and
 f) actuator means (2, 9) separate from and operable independently of said transport and manipulation handle for moving the tongs between an opened and closed position and to extend and retreat the hold-up element.

6. The apparatus of claim 5, wherein the jaws (18, 23) of the tongs have replaceable linings (22) for matching them to various shapes and sizes of bead.

7. The apparatus of claim 5, wherein one jaw (18) of the tongs is pivotably hinged at the support element (1).

8. The apparatus of claim 7, wherein two actuators are provided with the actuator for the hold-up element (7) and the actuator for opening and closing the pivotable jaw (18) each have a manually movable pivoting lever, mechanically connected to the hold-up element (7) and to the movable jaw (18).

9. The apparatus of claim 5, wherein the actuator means for moving the tongs (18, 23) and for extending the hold-up element (7) includes:
 a) at least one pressure actuated cylinder (2 or 9) connected to a pressure supply line; and
 b) a manual control valve (26) for operating each of the cylinders.

10. The apparatus of claim 1, wherein the actuator is coupled to a hydraulic hand pump.

11. The apparatus of claim 5, further comprising:
 a) a switch clock (31) electrically connected to the electrical heating elements (20, 24) for controlling their time of operation.

12. The apparatus of claim 11, wherein:
 a) the operation of the pressure cylinders is electrically controlled; and
 b) the switch clock is electrically connected to said cylinders for controlling their operation.

13. A hand-held apparatus for vulcanizing the bead zone of a pneumatic tire comprising;
 a) a support element (1);
 b) electrically heatable tongs disposed at one end of the support element and having jaws (18, 23) for gripping the section of the bead that is to be vulcanized;
 c) a hold-up element (7) disposed extendably at the other end of the support element for supporting against the diametrically opposite side of the bead from the section of the bead to be vulcanized;
 d) at least one transport and manipulation handle (25) for transporting the apparatus and placing it in operative position relative to the section of the bead of the tire to be vulcanized; and
 e) actuator means for moving the tongs between an opened and closed position and to extend and retract the hold-up element, said actuator means including at least one pressure actuated cylinder (2 or 9) for activating the tongs (18, 23) and the hold-up element (7) and a manual control valve (26) for operating each of the cylinders.

* * * * *